United States Patent
Ren et al.

(10) Patent No.: US 9,660,539 B2
(45) Date of Patent: May 23, 2017

(54) SWITCHING POWER SUPPLIES, AND SWITCH CONTROLLERS FOR SWITCHING POWER SUPPLIES

(71) Applicant: O2Micro, Inc., Santa Clara, CA (US)

(72) Inventors: Zhimou Ren, Sichuan (CN); Ying-Chieh Su, New Taipei (TW); Jun Ren, Sichuan (CN); Ching-Chuan Kuo, Taipei (TW); Yunning Xie, Sichuan (CN); Feng Lin, Sichuan (CN)

(73) Assignee: 02Micro Inc., Santa Clara, CA (US)

( * ) Notice: Subject to any disclaimer, the term of this patent is extended or adjusted under 35 U.S.C. 154(b) by 0 days.

(21) Appl. No.: 15/005,673

(22) Filed: Jan. 25, 2016

(65) Prior Publication Data

US 2016/0226388 A1    Aug. 4, 2016

(30) Foreign Application Priority Data

Jan. 30, 2015 (CN) .......................... 2015 1 0050177

(51) Int. Cl.
  *H02M 3/335* (2006.01)
  *H02M 1/00* (2006.01)
(52) U.S. Cl.
  CPC .............. *H02M 3/33507* (2013.01); *H02M 2001/0009* (2013.01); *H02M 2001/0025* (2013.01)
(58) Field of Classification Search
  CPC ................ H02M 3/33523; H02M 3/33507
  USPC .......................................... 363/21.15–21.18
  See application file for complete search history.

(56) References Cited

U.S. PATENT DOCUMENTS

| 8,213,191 B2 | 7/2012 | Liang | |
| 8,305,004 B2 * | 11/2012 | Shao | H02M 1/4225 315/209 R |
| 8,488,342 B2 * | 7/2013 | Zhang | H02M 3/33523 323/242 |
| 8,824,173 B2 | 9/2014 | Fang et al. | |
| 2011/0013426 A1 * | 1/2011 | Keller | H02M 1/34 363/21.15 |

(Continued)

FOREIGN PATENT DOCUMENTS

| CN | 101242146 A | 8/2008 |
| CN | 103683204 A | 3/2014 |
| TW | 201126885 A | 8/2011 |

(Continued)

*Primary Examiner* — Adolf Berhane
*Assistant Examiner* — Gary Nash (57) ABSTRACT

A switching power supply includes a power converter which includes a transformer and a switch, a current sensor, a switch controller and a compensation resistor. The current sensor is operable for generating a current monitoring signal indicating a current through a primary winding of the transformer. The switch controller is operable for receiving a feedback signal indicating an output voltage of the power converter, generating a driving signal based on the feedback signal to control an input power and an output power of the transformer, receiving a line voltage signal indicating an input voltage of the power converter, and generating a compensation current corresponding to a peak value of the line voltage signal. The compensation resistor is coupled between the current sensor and the switch controller. A voltage of the current monitoring signal is inversely proportional to the input voltage under control of the compensation current and the compensation resistor.

17 Claims, 8 Drawing Sheets

(56) References Cited

U.S. PATENT DOCUMENTS

2014/0021786 A1* 1/2014 Fang ................. H02M 3/33523
307/35

FOREIGN PATENT DOCUMENTS

TW        I442677 B    6/2014
TW        I483524 B    5/2015

* cited by examiner

SWITCHING POWER SUPPLIES, AND SWITCH CONTROLLERS FOR SWITCHING POWER SUPPLIES

RELATED APPLICATION

This application claims priority to Chinese Patent Application No. 201510050177.7, titled "Switching Power Supplies and Switch Controllers for Switching Power Supplies," filed on Jan. 30, 2015, with the State Intellectual Property Office of the People's Republic of China.

BACKGROUND

Switching power supplies are power converting circuits that are widely used in electronic devices such as televisions and computers. A switching power supply converts an AC (alternating current) input power to a DC (direct current) output power, and controls the output power by pulse-width modulation (PWM). A switching power supply adopts various protection function, e.g., over current protection (OCP), over voltage protection (OVP), and over temperature protection (OTP) to prevent the system from being damaged. The OCP limits the maximum level of the current of the switching devices by cycle-by-cycle current limiting.

Figure 1:
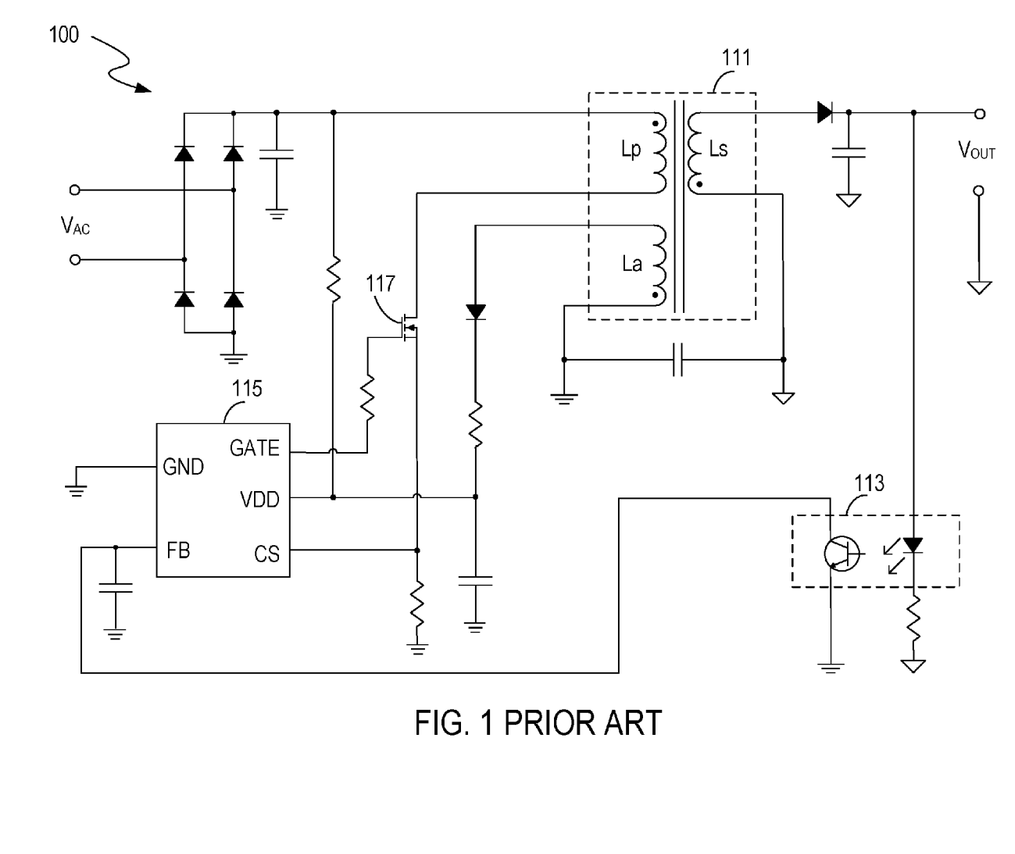
FIG. 1 shows a conventional switching power supply.

FIG. 1 illustrates a conventional flyback-type switching power supply 100 which includes a bridge rectifier and an isolated DC/DC converter. The isolated DC/DC converter includes a transformer 111, an optical-coupler 113, a switch controller 115 and a switch 117, e.g., a metallic oxide semiconductor field effect transistor (MOSFET).

For the conventional switching power supply 100, if the input voltage changes from AC 85V to AC 265V, the maximum output power changes significantly due to the following two reasons. First, if the input voltage is relatively high, then the switching power supply 100 operates in a discontinuous conduction mode (DCM) and an inductor current error appears because of the switching-off delay which is caused by the driving stage of the switch controller 115. Second, if the input voltage is relatively low, the switching power supply 100 operates in a continuous conduction mode (CCM). The power transmission efficiency in CCM is lower than in DCM. As such, the maximum output power of the switching power supply 100 is significant greater if the switching power supply 100 receives a relatively high input voltage, which is undesirable. Currently, duty cycle compensation is adopted to maintain a stable maximum output power for a wide range of the input voltage. A drawback of this method is that the output power is affected by the inductance of the inductor in the circuit. Because the error of the inductance can be up to 20% of the rated value, it is difficult to adjust the inductance.

Furthermore, in a switching power supply, one or more safety capacitors (XCap) need to be installed between the two terminals of the AC input in order to suppress the electromagnetic interference (EMI). According to safety requirements, if the AC power source is unplugged, the voltage across the safety capacitor must be less than 37% of its peak voltage after one second. In other words, the voltage across the safety capacitor should rapidly decrease to a safe value to make sure the remaining electric charge will not harm a user.

Figure 2:
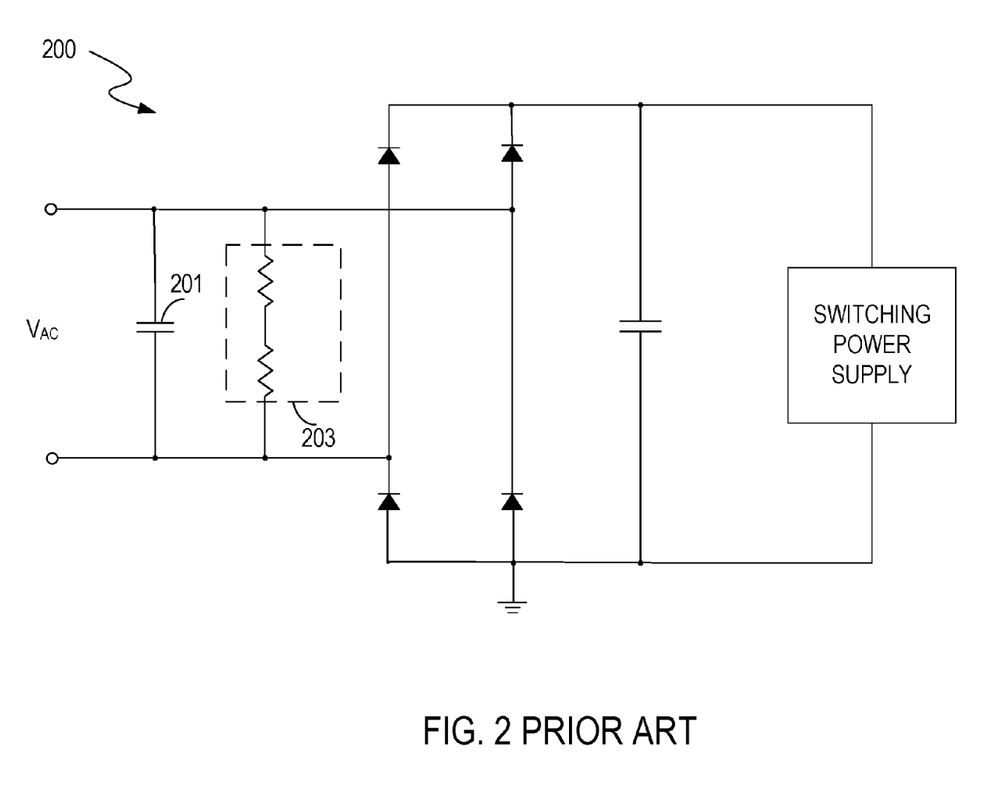
FIG. 2 shows a conventional resistor discharging circuit.

FIG. 2 is a conventional resistor discharging circuit 200. As shown in FIG. 2, one or more safety resistors 203 are coupled between two terminals of the AC input to achieve quick discharging of the safety capacitor 201 if the AC power source is unplugged. A drawback of this solution is that the safety resistors will cause relatively large power dissipation.

SUMMARY

Embodiments in accordance with the present invention provide a switching power supply and a switch controller for the switching power supply.

In an embodiment, a switching power supply includes a power converter which includes a transformer and a switch, a current sensor, a switch controller and a compensation resistor. The current sensor is operable for generating a current monitoring signal indicating a current through a primary winding of the transformer. The switch controller is operable for receiving a feedback signal indicating an output voltage of the power converter, generating a driving signal based on the feedback signal to control an input power and an output power of the transformer, receiving a line voltage signal indicating an input voltage of the power converter and generating a compensation current corresponding to a peak value of the line voltage signal. The compensation resistor is coupled between the current sensor and the switch controller. A voltage of the current monitoring signal is inversely proportional to the input voltage under control of the compensation current and the compensation resistor.

In another embodiment, a switch controller includes a feedback terminal, a driving terminal, a line voltage monitoring terminal and a current monitoring terminal. The switch controller is operable for controlling a power converter comprising a transformer and a switch controlled by a driving signal. The transformer includes a primary winding operable for receiving an input power from an AC/DC converter and a secondary winding operable for providing an output power for a load. The feedback terminal is operable for receiving a feedback signal from an optical-coupler, where the feedback signal indicates an output voltage of the power converter. The driving terminal is operable for providing the driving signal to control the input power and the output power based on the feedback signal. The line voltage monitoring terminal is operable for receiving a line voltage signal indicating an input voltage of the power converter. The input voltage is provided to the power converter by the AC/DC converter. The current monitoring terminal is operable for receiving a current monitoring signal indicating a current through the primary winding, where a compensation current corresponding to a peak value of the line voltage signal flows through the current monitoring terminal. The current monitoring terminal is coupled to a compensation resistor. A voltage of the current monitoring signal is inversely proportional to the input voltage under control of the compensation current and the compensation resistor.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 3:
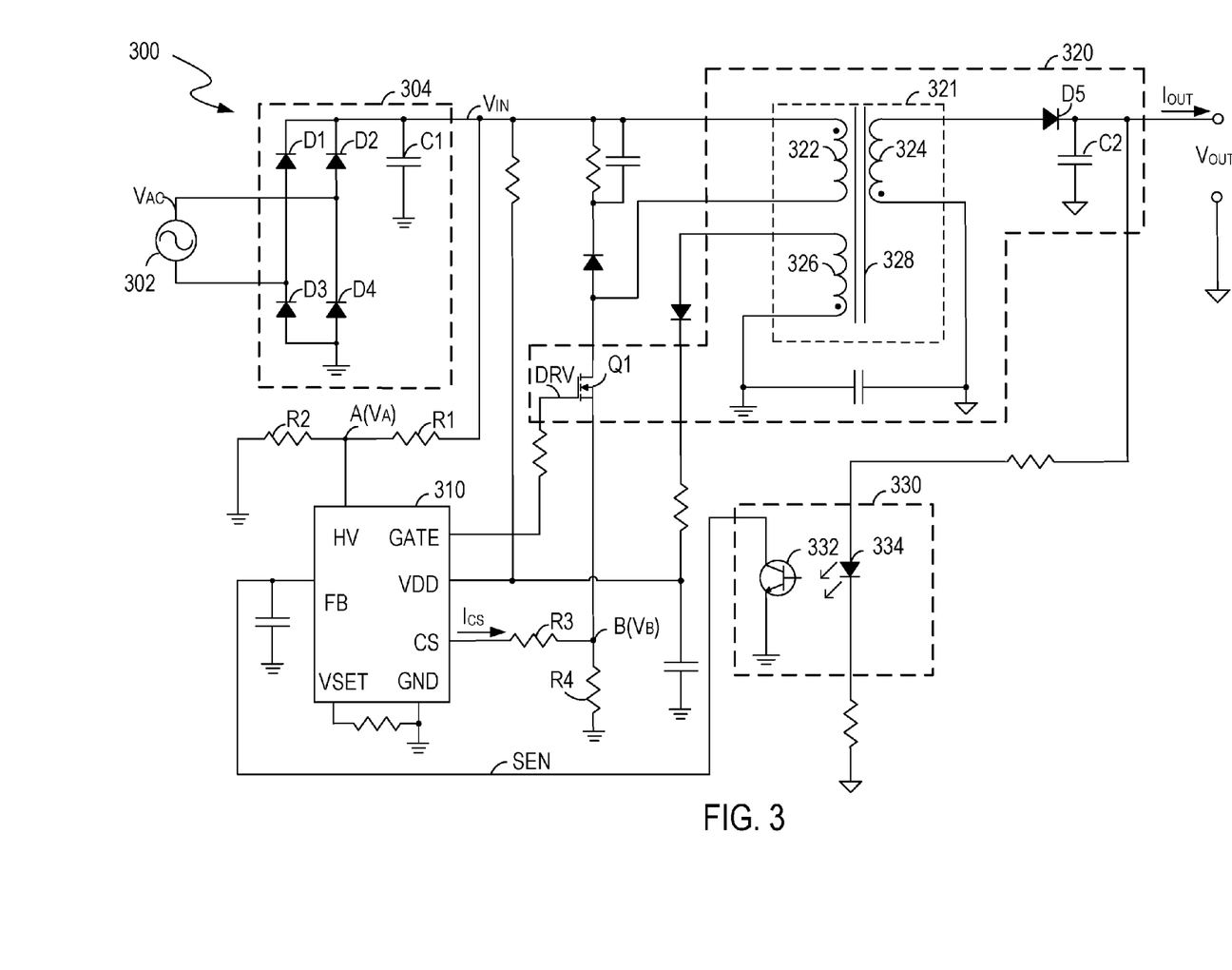
FIG. 3 shows a schematic diagram of a switching power supply in an embodiment according to the present disclosure.

FIG. 3 shows a schematic diagram of a switching power supply 300 in an embodiment according to the present disclosure. The switching power supply 300 includes an AC/DC converter 304, a switch controller 310, a power converter 320 and an optical-coupler 330. The AC/DC converter 304 converts an input AC voltage $V_{AC}$ from an AC power source 302 to an input DC voltage $V_{IN}$. In the example of FIG. 3, the AC/DC converter 304 is a bridge rectifier including diodes D1-D4 and a capacitor C1.

The power converter 320 receives the input DC voltage $V_{IN}$ from the AC/DC converter 304, and provides a regulated output voltage $V_{OUT}$ for a load. In the example of FIG. 3, the power converter 320 is an isolated DC/DC converter including a transformer 321, a switch Q1, a diode D5 and a capacitor C2. The transformer 321 includes a primary winding 322 receiving an input power from the AC/DC converter 304, a secondary winding 324 providing an output power for the load, and a magnetic core 328. The transformer 321 further includes an auxiliary winding 326 providing power for the switch controller 310. The transformer 321 may include a different number of windings other than three. In the example of FIG. 3, the switch Q1 coupled to the primary winding 322 is located outside of the switch controller 310. In another embodiment, the switch Q1 can be integrated within the switch controller 310.

The switch controller 310 is coupled to the primary winding 322 and the auxiliary winding 326. The switch controller 310 can be a flyback pulse width modulation (PWM) controller that generates a PWM signal to selectively turn on the switch Q1 which is coupled in series with the primary winding 322, and adjusts a duty cycle of the PWM signal to regulate the output power of the transformer 321. In one embodiment, the terminals of the switch controller 310 include FB, GATE, HV, CS, VSET, VDD and GND.

The feedback terminal FB receives a feedback signal SEN which indicates an output voltage $V_{OUT}$ provided by the power converter 320 for the load (the load is not shown in FIG. 3). The optical-coupler 330 includes a phototransistor 332 and an LED (light-emitting diode) 334. The terminal FB receives the feedback signal SEN from the phototransistor 332. The switch controller 310 generates a driving signal DRV (e.g., a PWM signal) at the driving terminal GATE based on the feedback signal SEN. The driving signal controls a conductance status of the switch Q1, e.g., on or off, so as to control the input power to the primary winding 322 and the output power to the load. In one embodiment, if the driving signal DRV is in a first state, e.g., logic high, then the switch Q1 is on, a current flows through the primary winding 322, and the magnetic core 328 stores energy. If the driving signal DRV is in a second state, e.g., logic low, then the switch Q1 is off, and the diode D5 coupled to the secondary winding 324 is forward biased such that the energy stored in the magnetic core 328 is released to the capacitor C2 and the load through the secondary winding 324. The switching power supply 300 further includes a shunt regulator (not shown in FIG. 3) coupled to the optical-coupler 330. The shunt regulator can adjust the feedback signal SEN based on the output voltage $V_{OUT}$ by controlling the optical-coupler 330. More specifically, in one embodiment, if the output voltage $V_{OUT}$ decreases, then the feedback signal SEN increases; the switch controller increases a duty cycle of the driving signal DRV in order to increase the output voltage $V_{OUT}$. If the output voltage $V_{OUT}$ increases, then the feedback signal SEN decreases; the switch controller decreases the duty cycle of the driving signal DRV in order to decrease the output voltage $V_{OUT}$. As such the output voltage $V_{OUT}$ is regulated.

The line voltage monitoring terminal HV receives a line voltage signal $V_A$ through a voltage divider including resistors R1 and R2. Node A is a common node between the resistor R1 and the resistor R2. The line voltage signal $V_A$ is a voltage at the node A. Although as shown in FIG. 3, the resistors R1 and R2 are located outside of the switch controller 310, in another embodiment, the resistors R1 and R2 are within the switch controller 310. As will described in detail below, the switch controller 310 detects a peak value of the line voltage signal $V_A$ and applies a corresponding compensation current $I_{CS}$ to the current monitoring terminal CS. The terminal CS monitors a current through the primary winding 322 by a current sensor R4, and generates a current monitoring signal indicating the current through the primary winding 322. A compensation resistor R3 is coupled between the terminal CS and the current sensor R4. A node B, which has a voltage $V_B$, is a common node between the compensation resistor R3 and the current sensor R4. In one embodiment, $V_B$ is used as the current monitoring signal. As will described in FIG. 4, with the function of the compensation current $I_{CS}$ and the compensation resistor R3, the output power of the switching power supply 300 can be substantially constant.

The terminal VSET is coupled to ground through a resistor and can determine an input under voltage protection threshold. The terminal VDD is coupled to the AC/DC converter 304 and the auxiliary winding 326. In one embodiment, an energy storage unit, e.g., a capacitor, is coupled between the terminal VDD and the ground. The energy storage unit powers the switch controller 310 when the switch Q1 is off. The terminal GND is coupled to ground.

Figure 4:
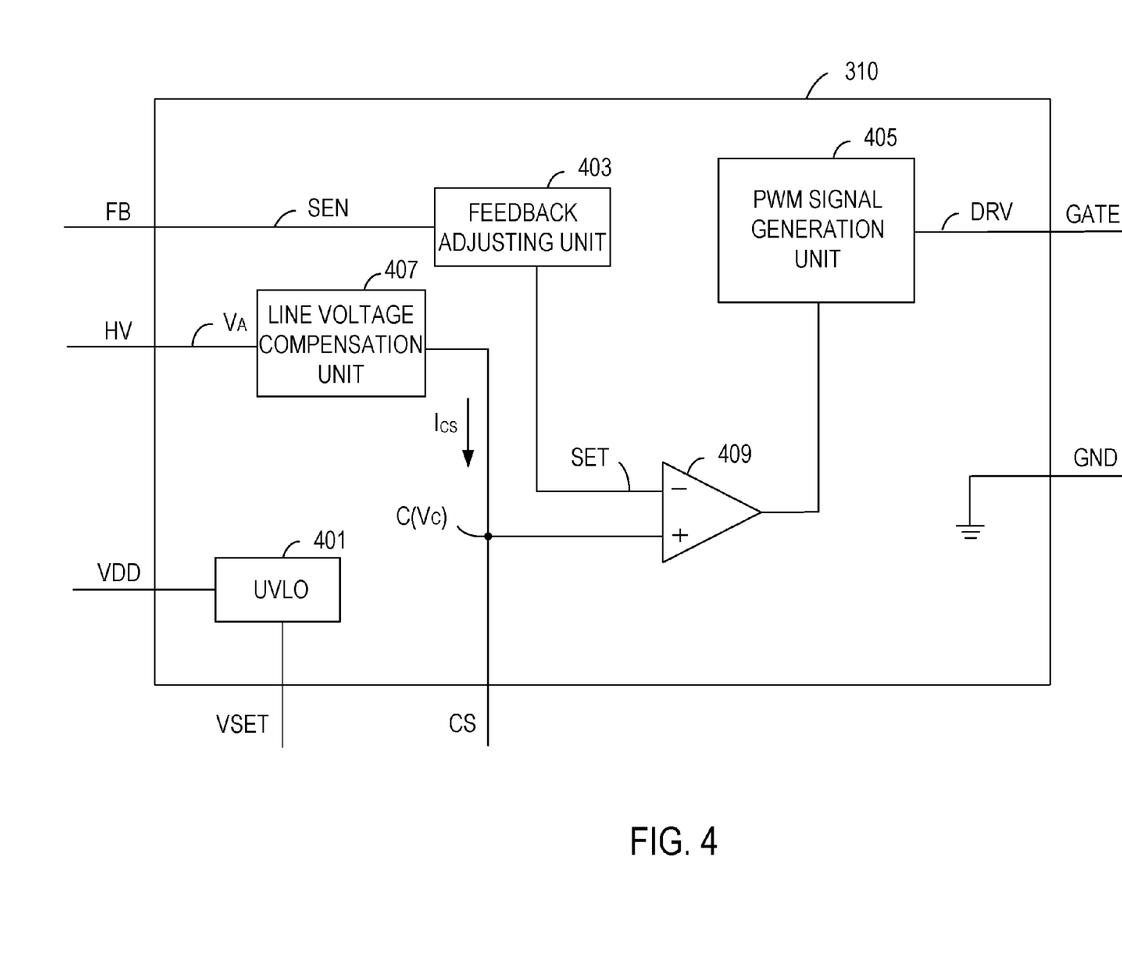
FIG. 4 shows a block diagram of a switch controller in an embodiment according to the present disclosure.

FIG. 4 shows a block diagram of the switch controller 310 in an embodiment according to the present disclosure. In the example of FIG. 4, the switch controller 310 includes an under-voltage lock out (UVLO) circuit 401, a feedback adjusting unit 403, PWM signal generation unit 405, a line voltage compensation unit 407 and a comparator 409.

The UVLO circuit 401 is coupled to the terminal VDD and the terminal VSET, and selectively turns on one or more components in the switch controller 310.

In one embodiment, if the voltage at the terminal VDD is greater than a first voltage, then the UVLO circuit 401 turns on all components in the switch controller 310. If the voltage at the terminal VDD is greater than a second voltage and less than the first voltage, then the UVLO circuit 401 turns off some of the components in the switch controller 310 to save power. If the voltage at the terminal VDD is less than the second voltage, then the UVLO circuit 401 turns off all components in the switch controller 310. The first voltage is greater than the second voltage.

The feedback adjusting unit 403 is coupled to the terminal FB. In one embodiment, the feedback adjusting unit 403 is a voltage divider that provides a reference signal SET that is proportional to the feedback signal SEN.

The line voltage compensation unit 407, which is coupled to the terminal HV, receives the line voltage signal $V_A$ which indicates the DC input voltage $V_{IN}$, detects a peak value of the line voltage signal $V_A$, and provides a corresponding compensation current $I_{CS}$ to the current monitoring terminal CS. The compensation current $I_{CS}$ can be proportional to the AC voltage $V_{AC}$, the DC voltage $V_{IN}$ and the line voltage signal $V_A$. If the AC voltage $V_{AC}$ increases, e.g., from AC 85V to AC 265V, the compensation current $I_{CS}$ increases accordingly.

The comparator 409 compares an output voltage from the line voltage compensation unit 407 (e.g., a voltage $V_C$ at the node C) with the reference signal SET from the feedback adjusting unit 403. An output of the comparator 409 is coupled to the PWM signal generation unit 405 to generate the driving signal DRV. In one embodiment, the PWM signal generation unit 405 can include a SR flip-flop and pulse generator. In operation, if $V_C$ increases to greater than the reference signal SET, the comparator 409 outputs a logic high to the PWM signal generation unit 405 such that the PWM signal generation unit 405 adjusts the driving signal DRV to the second state to turn off the switch Q1. On the other hand, the pulse generator in the PWM signal generation unit 405 periodically adjusts the driving signal DRV to the first state to turn on the switch Q1. As such, the voltage of $V_C$ is limited and controlled by the reference signal SET, and is in turn limited and controlled by the feedback signal SEN.

To facilitate understanding of present disclosure, assume that the power transmission efficiency of the switching power supply 300 (FIG. 3) is constant and is approximately 100%. In other words, the output power $P_{OUT}$ of the switching power supply 300 is assumed to be substantially equal to the input power $P_{IN}$ of the switching power supply 300, although in practical application the output power $P_{OUT}$ can be different from the input power $P_{IN}$ because of the power dissipation of the system.

Based on the nature of the isolated DC/DC converter 320, if the input power $P_{IN}$ is constant, then the voltage $V_B$ at the node B should be inversely proportional to the DC input voltage $V_{IN}$. As can be obtained by FIG. 3 and FIG. 4, the voltage $V_B$ can be written by:

$$V_B = V_C - I_{CS} \times r3, \qquad (1)$$

where $V_C$ is the output voltage from the line voltage compensation unit 407 and r3 is the resistance of the compensation resistor R3. If the AC voltage $V_{AC}$ increases, e.g., from AC 85V to AC 265V, then the DC voltage $V_{IN}$, the line voltage signal $V_A$ and the compensation current $I_{CS}$ increase, and the voltage $V_B$ decreases. If the AC voltage $V_{AC}$ decreases, e.g., from AC 265 to AC 85V, then the DC voltage $V_{IN}$, the line voltage signal $V_A$ and the compensation current $I_{CS}$ decrease, and the voltage $V_B$ increases. The resistance of the resistor R3 can be chosen so that the product of the voltage $V_B$ and the input DC voltage $V_{IN}$ can be substantially constant. That is, the input power $P_{IN}$ is constant. It can be understood by a person in the pertinent art that the proper value of the resistance of the compensation resistor R3 depends on the range of the input DC voltage $V_{IN}$, and can be obtained empirically. As assumed above, the power transmission efficiency of the switching power supply 300 is constant and is approximately 100%; therefore, the output power $P_{OUT}$ is constant.

The input power $P_{IN}$ of the isolated DC/DC converter 320 is the product of the input voltage $V_{IN}$ and the average input current flowing through the inductor 322. The average input current flowing through the inductor 322 increases if the input voltage $V_{IN}$ decreases, and vice versa. The output power $P_{OUT}$ of the isolated DC/DC converter 320 equals the input power $P_{IN}$. Thus, by utilizing the line voltage compensation unit 407 and the compensation resistor R3, the variation of the input power $P_{IN}$ and the output power $P_{OUT}$ caused by the variation of the input voltage $V_{IN}$ is reduced. The resistance of the compensation resistor R3 can be chosen so that the input power $P_{IN}$ and the output power $P_{OUT}$ can be substantially constant regardless of the variation of the input voltage $V_{IN}$.

Figure 5:
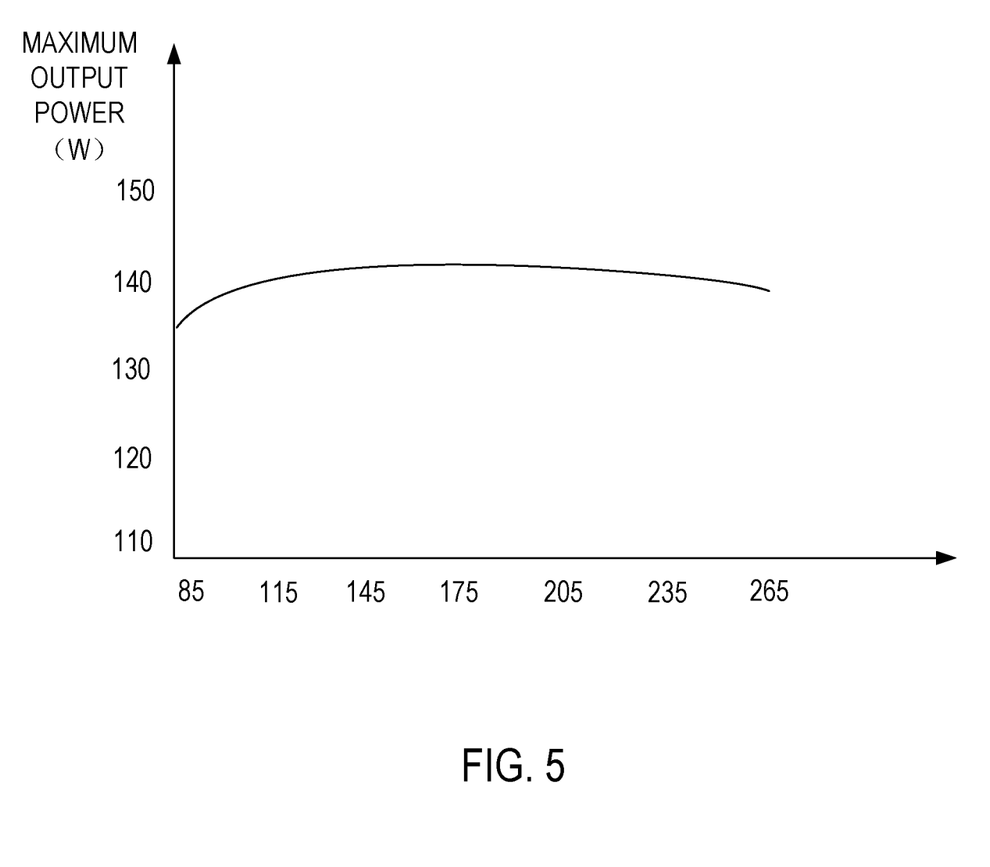
FIG. 5 shows a waveform illustrating the maximum value of the output power of a switching power supply as a function of an input voltage in an embodiment according to the present disclosure.

FIG. 5 shows a waveform illustrating the maximum value of the output power $P_{OUT}$ of the switching power supply 300 (FIG. 3) as a function of the input voltage $V_{IN}$ in an embodiment according to the present disclosure. As shown in FIG. 5, although the input voltage $V_{IN}$ increases from AC 85V to AC 265V, the maximum output power is stabilized around 135 W. This indicates that the input power $P_{IN}$ and the output power $P_{OUT}$ can be substantially constant regardless of the variation of the AC input voltage $V_{AC}$ and the DC input voltage $V_{IN}$ due to the compensation current $I_{CS}$ and the compensation resistor R3.

Figure 6:
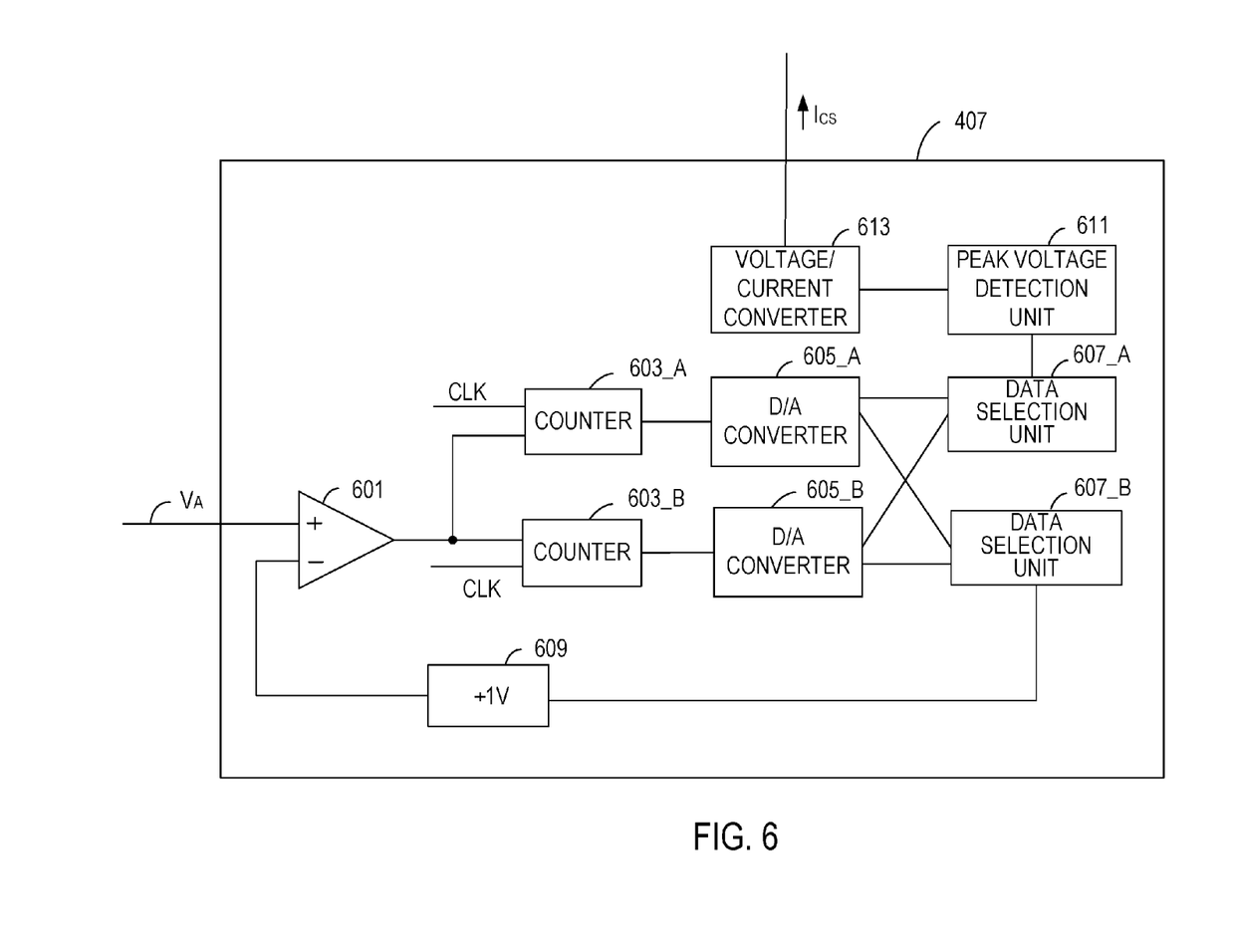
FIG. 6 shows a block diagram of a line voltage compensation unit in an embodiment according to the present disclosure.

FIG. 6 shows a block diagram of the line voltage compensation unit 407 in an embodiment according to the present disclosure. In the FIG. 6 embodiment, the line voltage compensation unit 407 includes a comparator 601, counters 603_A and 603_B, D/A converters 605_A and 605_B, data selection units 607_A and 607_B, a voltage shifting unit 609, a peak voltage detection unit 611 and a voltage/current converter 613.

A non-inverting input of the comparator 601 is coupled to the terminal HV and receives the line voltage signal $V_A$ which indicates the DC input voltage $V_{IN}$. As can be seen in FIG. 3, the line voltage signal $V_A$ is proportional to the DC input voltage $V_{IN}$. An inverting input of the comparator 601 is coupled to the voltage shifting unit 609. In the example of FIG. 6, the voltage shifting unit 609 is configured to increase a voltage from the output of the data selection unit 607_B by 1V. In another embodiment, the boosting unit 609 can be configured to increase or decrease the voltage by other values. The comparator 601 and the voltage shifting unit 609 can ensure that, if the AC input voltage $V_{AC}$ is less than a first threshold (e.g., $V_{AC}$ is less than AC 85V, and accordingly the line voltage signal $V_A$ is less than a second threshold, e.g., 1V, due to the function of the voltage divider), then the line voltage compensation unit 407 does not perform compensation operation to the line voltage (e.g., it stops generating the compensation current $I_{CS}$).

Counters 603_A and 603_B are coupled to the output of the comparator 601 and a clock signal CLK. Counters 603_A and 603_B are enabled and disabled based on the output of the comparator 601 and are driven by a clock signal CLK. The voltage shifting unit 609 can provide the first threshold and the second threshold. If the AC input voltage $V_{AC}$ is greater than the first threshold (e.g., AC 85V), then the line voltage signal $V_A$ is greater than the second threshold (e.g., 1V). Assume that the initial output of the data selection unit 607_B is zero. The voltage at the non-inverting input of the comparator 601 is greater than the voltage at the inverting input of the comparator 601. In such a situation, the output of the comparator 601 is logic high and the counters 603_A and 603_B are alternately enabled. In one embodiment, the line voltage compensation unit 407 operates in multiple cycles; each cycle corresponds to 30 ms (milliseconds) in length.

During a first cycle (e.g., 0-30 ms), the counter 603_A is enabled and generates counter values in response to the clock signal CLK. The counter 603_B is disabled.

During a second cycle (e.g., 31-60 ms), the counter 603_A is disabled and its counter value is held. The counter value of the counter 603_A at the end of the first cycle (e.g., 0-30 ms) is converted to an analog signal by the D/A converters 605_A. The counter value and the converted analog signal can indicate a peak voltage of the line voltage signal $V_A$ at the terminal HV during the first cycle (e.g., 0-30 ms). The analog signal from the counter 603_A and the D/A converter 605_A is selected by the data selection units 607_A and forwarded to the peak voltage detection unit 611. The voltage/current converter 613 is coupled to the peak voltage detection unit 611 and converts the selected analog signal to a corresponding compensation current $I_{CS}$ which flows through the terminal CS. During the second cycle (e.g., 31-60 ms), the counter 603_B is enabled and generates counter values in response to the clock signal CLK.

During a third cycle (e.g., 61-90 ms), the counter 603_A is enabled again and generates counter values in response to the clock signal CLK. The counter 603_B is disabled. The counter value of the counter 603_B at the end of the second cycle (e.g., 31-60 ms) is converted to an analog signal by the D/A converters 605_B. The counter value and the converted analog signal can indicate a peak voltage of the line voltage signal $V_A$ at the terminal HV during the second cycle (e.g., 31-60 ms). The analog signal from the counter 603_B and the D/A converter 605_B is selected by the data selection units 607_A and forwarded to the peak voltage detection unit 611. The voltage/current converter 613 is coupled to the peak voltage detection unit 611 and converts the selected analog signal to a corresponding compensation current $I_{CS}$ which flows through the terminal CS.

During a fourth cycle (e.g., 91-120 ms), the counter 603_A is disabled and the counter 603_B is enabled.

As such, the counter 603_A and the counter 603_B are alternately enabled to count and to obtain a counter value corresponding to a peak voltage of the line voltage signal $V_A$ in each cycle. The held counter value from a disabled counter is selected and forwarded to the voltage/current converter 613 to generate a corresponding compensation current $I_{CS}$. In other words, the value of the compensation current $I_{CS}$ is updated in each cycle according to the peak voltage of the line voltage signal $V_A$.

The data selection unit 607_B selects an output from an enabled counter and the corresponding D/A converter. For example, if the counter 603_A is enabled to count, the data selection unit 607_B selects an analog signal from the D/A converter 605_A. The voltage of the analog signal from the D/A converter 605_A is increased by 1V by the voltage shifting unit 609. Due to such a configuration, if the voltage of the line voltage signal $V_A$ starts to decrease after reaching the peak, the output of the comparator 601 changes from logic high to logic low, such that the corresponding enabled counter (the counter 603_A in the above example) is disabled and a counter value corresponding to the peak voltage of the line voltage signal $V_A$ is locked and held.

Although 30 ms is used as the preset cycle in the above example, other time values can be used as the preset time cycle depending on input AC voltage to ensure the peak voltage of the line voltage signal $V_A$ during each cycle can be detected.

Figure 7:
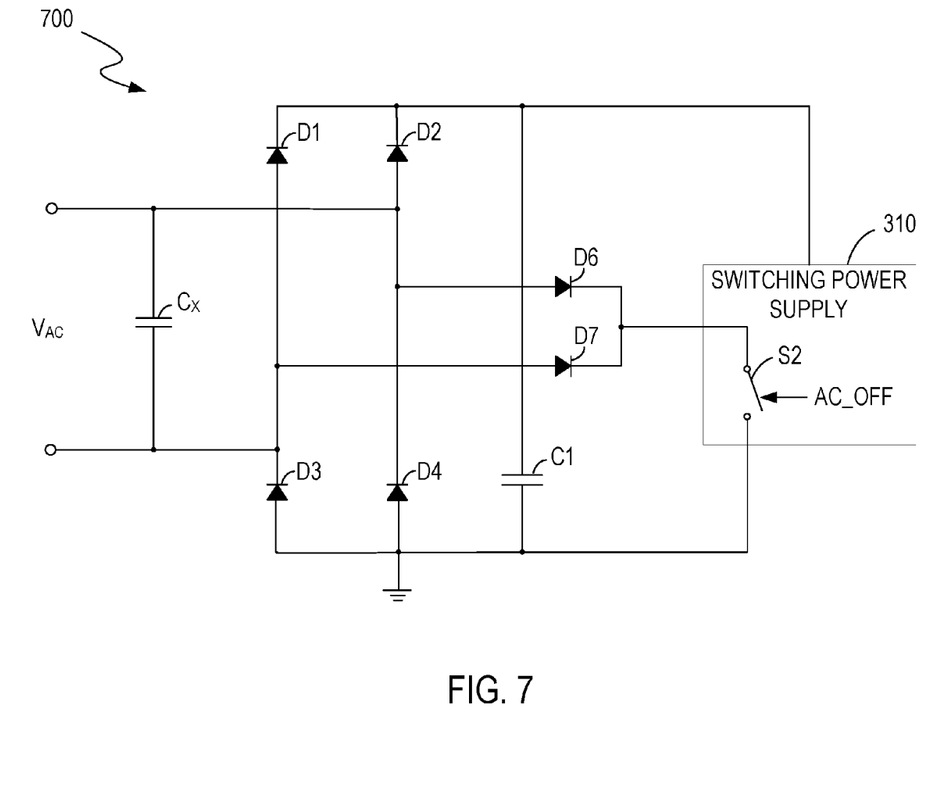
FIG. 7 shows a schematic diagram of a discharging circuit in an embodiment according to the present disclosure.

FIG. 7 shows a schematic diagram of a discharging circuit 700 in an embodiment according to the present disclosure. Compared with FIG. 2, the discharging circuit 700 utilizes two diodes D6 and D7 and a discharging switch S2 instead of the safety resistors. In one embodiment, the discharging switch S2 is located outside of the switch controller 310. In another embodiment, the discharging switch S2 is integrated within the switch controller 310. If the AC power source is unplugged, the status of the discharging switch S2 is changed from off to on in response to a discharging signal AC_OFF. The electric charge on the safety capacitor $C_X$ is quickly discharged through the diode D6 or the diode D7. Advantageously, if the AC power source is unplugged, the voltage across the safety capacitor is less than 37% of peak voltage after one second, and the power dissipation caused by the safety resistors in FIG. 2 is reduced.

Figure 8:
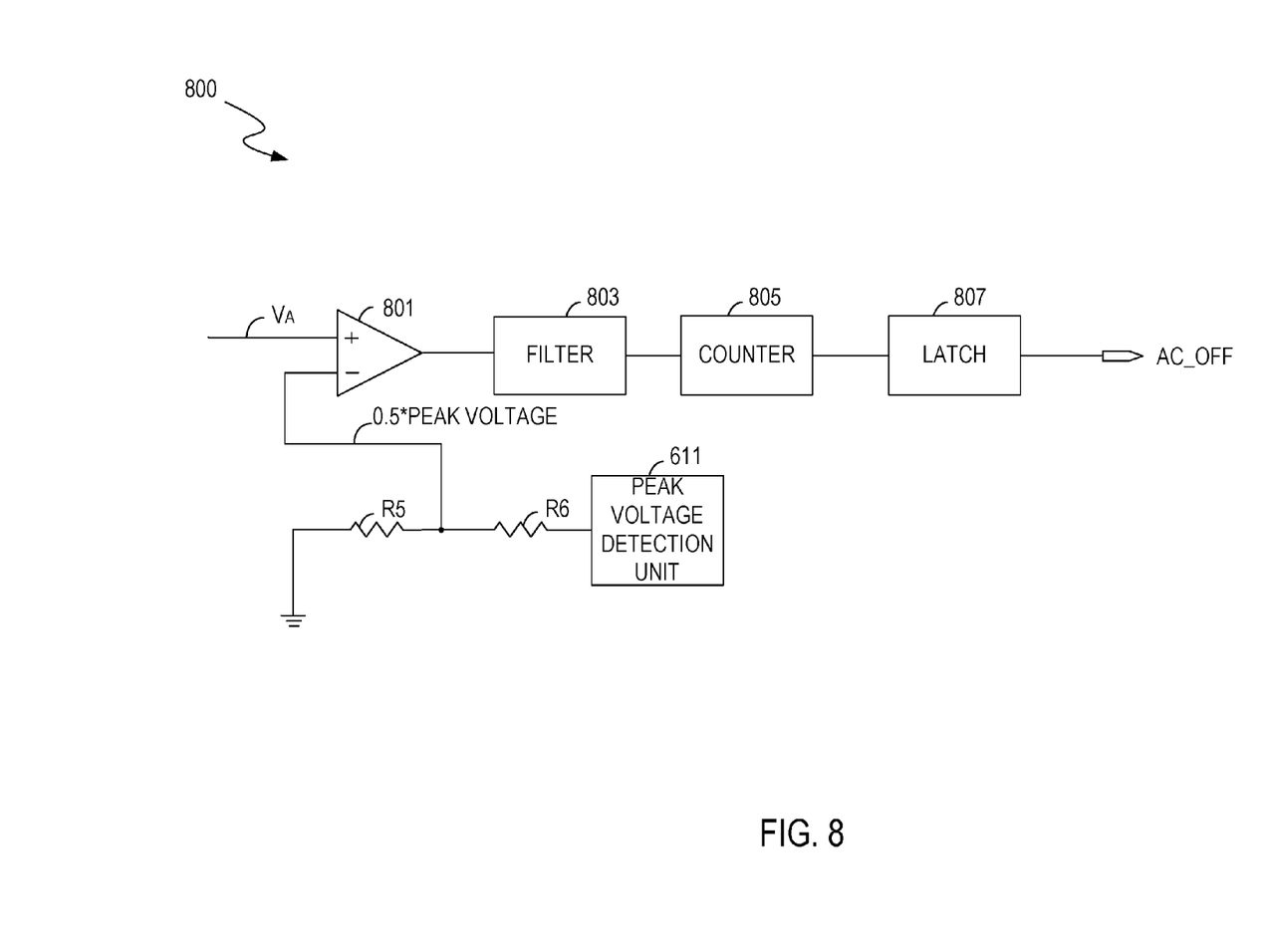
FIG. 8 shows a block diagram of a circuit generating a discharging signal in an embodiment according to the present disclosure.

FIG. 8 shows a block diagram of a circuit 800 for generating the discharging signal AC_OFF in an embodiment according to the present disclosure. Elements in FIG. 8 labeled the same in FIG. 6 have similar functions. The circuit 800 can be integrated in the switch controller 310. For clarity and brevity, only the part of the components in the switch controller 310 that is functionally related to the generation of the discharging signal AC_OFF is shown in FIG. 8. The circuit 800 includes a comparator 801, a filter 803, a counter 805, a latch 807, resistors R5 and R6, and a peak voltage detection unit 611. A non-inverting input of the comparator 801 is coupled to the terminal HV and receives the line voltage signal $V_A$ which indicates the DC input voltage $V_{IN}$. An inverting input of the comparator 801 is coupled to the peak voltage detection unit 611 through a voltage divider including the resistors R5 and R6. In the example of FIG. 8, the resistors R5 and R6 have the same resistance. Therefore, a voltage with a value half of (0.5 times) the peak voltage of the line voltage signal $V_A$ detected in a previous cycle (e.g., a previous 30 ms) is applied to the inverting input of the comparator 801. In another example, the resistors R5 and R6 have different resistances such that a voltage with a different value proportional to the peak voltage of the line voltage signal $V_A$ is applied to the inverting input of the comparator 801. People skilled in the pertinent art understand other configurations can be adopted to implement the circuit 800 to generate the discharging signal AC_OFF.

The comparator 801 compares an instant value of the line voltage signal $V_A$ in a current cycle (e.g., 31-60 ms) with a voltage value received at the inverting input of the comparator 801, e.g., 0.5 times the peak voltage of the line voltage signal $V_A$ in a previous cycle (e.g., 0-30 ms). The counter 805 is controlled by an output from the comparator

801. The latch 807 generates the discharging signal AC_OFF to control the discharging switch S2 based on a status of the counter 805.

For example, if the AC power source 302 is connected with the switching power supply 300, then the instant value of the line voltage signal $V_A$ will increase above a threshold, e.g., 0.5 times the peak voltage of the line voltage signal $V_A$ which is detected in a previous cycle. Accordingly, the comparator 801 outputs a logic high which is transmitted to the counter 805 through the filter 803. The counter 805 is enabled and the counter value is changed accordingly. The latch 807 generates the discharging signal AC_OFF having a first level (e.g., logic low) to maintain the discharging switch S2 off and to prevent the safety charger $C_X$ from discharging.

If the AC power source 302 is disconnected from the switching power supply 300, then the instant value of the line voltage signal $V_A$ will decrease to less than the threshold, e.g., 0.5 times of the peak voltage of the line voltage signal $V_A$ which is detected in a previous cycle. Accordingly, the output from the comparator 801 remains logic low, the counter 805 is disabled and the counter value remains unchanged. If the counter value remains unchanged for a preset time period (e.g., 30 ms), then the latch 807 generates the discharging signal AC_OFF having a second level (e.g., logic high) to turn on the discharging switch S2. As such, the electric charge on the safety capacitor $C_X$ is quickly discharged through the diode D6 or the diode D7.

As described above, the discharging circuit disclosed in present invention can quickly discharge the safety capacitor without the need of conventional safety resistors such that power dissipation is reduced. Furthermore, utilizing the line voltage compensation unit 407 and the compensation resistor R3, the switching power supply and the switch controller according to the present disclosure can reduce the variation of the input power and output power of the power converter caused by the variation of the input voltage $V_{IN}$.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A switching power supply comprising:
  a power converter comprising a transformer and a switch controlled by a driving signal, said transformer comprising a primary winding operable for receiving an input power from an AC/DC (alternating current/direct current) converter and a secondary winding operable for providing an output power for a load;
  a current sensor, coupled between said switch and ground, operable for generating a current monitoring signal indicating a current through said primary winding;
  a switch controller, coupled between an optical-coupler and said primary winding, operable for receiving a feedback signal from said optical-coupler, generating said driving signal based on said feedback signal to control said input power and said output power, receiving a line voltage signal indicating an input voltage of said power converter, and generating a compensation current corresponding to a peak value of said line voltage signal, wherein said feedback signal indicates an output voltage of said power converter, and wherein said AC/DC converter is operable for converting an AC voltage to said input voltage and providing said input voltage to said power converter; and
  a compensation resistor coupled between said current sensor and said switch controller, wherein a voltage of said current monitoring signal is inversely proportional to said input voltage under control of said compensation current and said compensation resistor, wherein said voltage of said current monitoring signal increases if said input voltage decreases, and wherein said voltage of said current monitoring signal decreases if said input voltage increases,
  wherein said switch controller comprises a line voltage compensation unit operable for generating said compensation current based on said line voltage signal, wherein said line voltage compensation unit comprises:
    a first counter, operable for generating a first counter value indicating a peak voltage of said line voltage signal during a first cycle;
    a second counter, operable for generating a second counter value indicating a peak voltage of said line voltage signal during a second cycle;
    a first D/A converter, coupled to said first counter, operable for converting said first counter value to a first analog signal indicating said peak voltage of said line voltage signal during said first cycle;
    a second D/A converter, coupled to said second counter, operable for converting said second counter value to a second analog signal indicating said peak voltage of said line voltage signal during said second cycle;
    a data selection unit, coupled to said first D/A converter and said second D/A converter, operable for providing a selected analog signal, wherein during said second cycle said data selection unit is operable for selecting said first analog signal as said selected analog signal; and
    a voltage/current converter, coupled to said peak voltage detection unit, operable for converting said selected analog signal to said compensation current.

2. The switching power supply of claim 1, wherein said transformer further comprises an auxiliary winding operable for providing power to said switch controller.

3. The switching power supply of claim 1, wherein said cycle is 30 milliseconds in length.

4. The switching power supply of claim 1, wherein said line voltage compensation unit further comprises a comparator and a voltage shifting unit, wherein said comparator has a non-inverting input operable for receiving said line voltage signal and an inverting input coupled to said voltage shifting unit, wherein said voltage shifting unit is operable for providing a threshold, wherein said line voltage compensation unit stops generating said compensation current if said line voltage signal is less than said threshold.

5. The switching power supply of claim 4, wherein said first counter and said second counter are enabled and disabled based on an output of said comparator, wherein said first counter and said second counter are alternately enabled to count in response to a clock signal if said line voltage signal is greater than said threshold.

6. A switching power supply comprising:
a power converter comprising a transformer and a switch controlled by a driving signal, said transformer comprising a primary winding operable for receiving an input power from an AC/DC (alternating current/direct current) converter and a secondary winding operable for providing an output power for a load;
a current sensor, coupled between said switch and ground, operable for generating a current monitoring signal indicating a current through said primary winding;
a switch controller, coupled between an optical-coupler and said primary winding, operable for receiving a feedback signal from said optical-coupler, generating said driving signal based on said feedback signal to control said input power and said output power, receiving a line voltage signal indicating an input voltage of said power converter, and generating a compensation current corresponding to a peak value of said line voltage signal, wherein said feedback signal indicates an output voltage of said power converter, and wherein said AC/DC converter is operable for converting an AC voltage to said input voltage and providing said input voltage to said power converter;
a compensation resistor coupled between said current sensor and said switch controller, wherein a voltage of said current monitoring signal is inversely proportional to said input voltage under control of said compensation current and said compensation resistor, wherein said voltage of said current monitoring signal increases if said input voltage decreases, and wherein said voltage of said current monitoring signal decreases if said input voltage increases;
a safety capacitor;
at least one diode; and
a discharging switch coupled to said safety capacitor, wherein said discharging switch is turned on to discharge said safety capacitor through said at least one diode if an AC power source which provides said AC voltage is disconnected from said switching power supply.

7. The switching power supply of claim 6, further comprising:
a comparator operable for comparing an instant value of said line voltage signal in a first cycle with a voltage value proportional to said peak voltage of said line voltage signal in a second cycle preceding said first cycle;
a counter, controlled by an output from said comparator, operable for generating a counter value and for determining whether said AC power source is disconnected from said switching power supply; and
a latch, coupled to said counter, operable for generating a discharging signal to control said discharging switch based on a status of said counter.

8. The switching power supply of claim 7, wherein said voltage value is 0.5 times said peak voltage of said line voltage signal.

9. The switching power supply of claim 7, wherein said counter value remains unchanged if said instant value of said line voltage signal in said first cycle is less than said voltage value proportional to said peak voltage of said line voltage signal in said second cycle, and wherein said latch is operable for generating said discharging signal to turn on said discharging switch if said counter value remains unchanged for a preset time period.

10. A switch controller operable for controlling a power converter comprising a transformer and a switch controlled by a driving signal, said transformer comprising a primary winding operable for receiving an input power from an AC/DC converter (alternating current/direct current) and a secondary winding operable for providing an output power for a load, said switch controller comprising:
a feedback terminal operable for receiving a feedback signal from an optical-coupler, wherein said feedback signal indicates an output voltage of said power converter;
a driving terminal operable for providing said driving signal to control said input power and said output power based on said feedback signal;
a line voltage monitoring terminal operable for receiving a line voltage signal indicating an input voltage of said power converter, wherein said input voltage is provided to said power converter by said AC/DC converter; and
a current monitoring terminal operable for receiving a current monitoring signal indicating a current through said primary winding, wherein a compensation current corresponding to a peak value of said line voltage signal flows through said current monitoring terminal, wherein said current monitoring terminal is coupled to a compensation resistor, wherein a voltage of said current monitoring signal is inversely proportional to said input voltage under control of said compensation current and said compensation resistor, wherein said voltage of said current monitoring signal increases if said input voltage decreases, and wherein said voltage of said current monitoring signal decreases if said input voltage increases,
wherein said switch controller is operable for turning on a discharging switch to discharge a safety capacitor through at least one diode if an AC power source that provides an AC voltage to said AC/DC converter is disconnected from said AC/DC converter.

11. The switch controller of claim 10, further comprising a line voltage compensation unit operable for generating said compensation current based on said line voltage signal, wherein said line voltage compensation unit comprises:
a first counter, operable for generating a first counter value indicating a peak voltage of said line voltage signal during a first cycle;
a second counter, operable for generating a second counter value indicating a peak voltage of said line voltage signal during a second cycle;
a first D/A converter, coupled to said first counter, operable for converting said first counter value to a first analog signal indicating said peak voltage of said line voltage signal during said first cycle;
a second D/A converter, coupled to said second counter, operable for converting said second counter value to a second analog signal indicating said peak voltage of said line voltage signal during said second cycle;
a data selection unit, coupled to said first D/A converter and said second D/A converter, operable for providing a selected analog signal, wherein during said second cycle said data selection unit is operable for selecting said first analog signal as said selected analog signal; and
a voltage/current converter, coupled to said peak voltage detection unit, operable for converting said selected analog signal to said compensation current.

12. The switch controller of claim 11, wherein said cycle is 30 milliseconds in length.

13. The switch controller of claim 11, wherein said line voltage compensation unit further comprises a comparator and a voltage shifting unit, wherein said comparator has a non-inverting input operable for receiving said line voltage signal and an inverting input coupled to said voltage shifting unit, wherein said voltage shifting unit is operable for providing a threshold, wherein said line voltage compensation unit stops generating said compensation current if said line voltage signal is less than said threshold.

14. The switch controller of claim 13, wherein said first counter and said second counter are enabled and disabled based on an output of said comparator, wherein said first counter and said second counter are alternately enabled to count in response to a clock signal if said line voltage signal is greater than said threshold.

15. The switch controller of claim 10, further comprising:
a comparator operable for comparing an instant value of said line voltage signal in a first cycle with a voltage value proportional to said peak voltage of said line voltage signal in a second cycle that precedes said first cycle;
a counter, controlled by an output from said comparator, operable for generating a counter value and for determining whether said AC power source is disconnected from said switching power supply; and
a latch, coupled to said counter, operable for generating a discharging signal to control said discharging switch based on a status of said counter.

16. The switch controller of claim 15, wherein said voltage value is 0.5 times said peak voltage of said line voltage signal.

17. The switch controller of claim 15, wherein said counter value remains unchanged if said instant value of said line voltage signal in said first cycle is less than said voltage value proportional to said peak voltage of said line voltage signal in said second cycle, and wherein said latch is operable for generating said discharging signal to turn on said discharging switch if said counter value remains unchanged for a preset time period.

* * * * *